United States Patent [19]

Marshall et al.

[11] Patent Number: 4,524,908

[45] Date of Patent: Jun. 25, 1985

[54] SET-BACK THERMOSTAT ASSEMBLY

[76] Inventors: John Marshall, 1300 Spear St., South Burlington, Vt. 05401; Henry B. Clark, Jr., Box 117, Underhill Center, Conn. 05490

[21] Appl. No.: 460,546

[22] Filed: Nov. 15, 1983

Related U.S. Application Data

[63] Continuation-in-part of Ser. No. 285,016, Jul. 20, 1981, abandoned.

[51] Int. Cl.³ .................. F23N 5/20; G05D 15/00
[52] U.S. Cl. ...................... 236/46 R; 236/51; 236/68 B
[58] Field of Search .............. 236/46 R, 47, 68 B, 236/51; 165/12

[56] References Cited

U.S. PATENT DOCUMENTS

| | | | |
|---|---|---|---|
| 3,972,471 | 8/1976 | Ziegler | 236/68 B |
| 3,979,060 | 9/1976 | Tierle | 236/46 R |

FOREIGN PATENT DOCUMENTS 1025937  11/1964  United Kingdom .............. 219/506

Primary Examiner—William E. Wayner
Attorney, Agent, or Firm—Thomas N. Neiman

[57] ABSTRACT

The assembly comprises a heat emitting element located in a thermostat and an electrical circuit for selectively energizing and deenergizing said element by means of local control or remotely activated circuitry. The assembly has means for allowing varying amounts of predetermined current to be conducted through said element. This allows for an unlimited variety of control over the amount of heating or cooling provided through direct or remote operation as specifically desired by the operator of the system.

1 Claim, 1 Drawing Figure

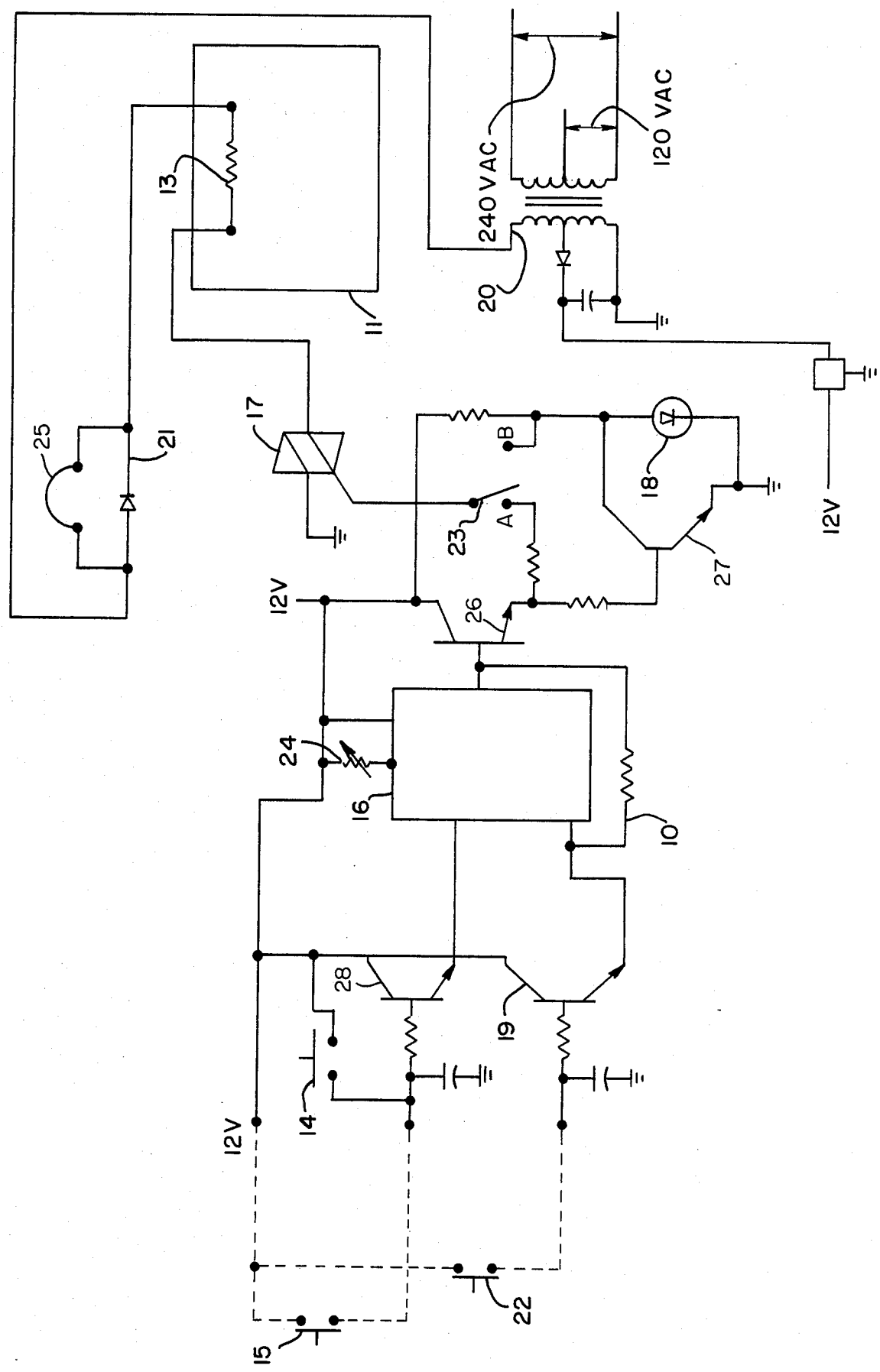

SET-BACK THERMOSTAT ASSEMBLY

This is a continuation-in-part of our copending application Ser. No. 06/285,016 originally filed on July 20, 1981 now abandoned.

This invention pertains to temperature thermostat controls, and in particular to set-back thermostat assemblies wherein the assembly has circuits to allow variable, predetermined levels of current to be provided to a heating element in the thermostat in order to control the amount of heating or cooling provided.

In the prior art, it is typical for set-back type thermostats to be controlled by timing devices. Such structure is shown, for instance, in U.S. Pat. No. 3,972,471 issued on Aug. 3, 1976 to Ronald Ziegler, for Automatic Temperature Setback System for Controlling a Heating Unit, and in U.S. Pat. No. 3,945,564 issued on Mar. 23, 1976 to Jon Smallegan, for Temperature Control System.

As shown in these patents, controllers for set-back thermostats comprise a timing device which turns the current off and on to the set-back heater. This arrangement has some built-in difficulties in that there is a predetermined schedule placed upon the thermostat operation and this may, or may not, fit the actual needs of the heating or cooling requirements. Another difficulty is the necessity of retrofit older systems to handle complex energy management systems or timer elements.

What has been needed is an assembly which is a single integrated unit. Especially what is needed is a manually or remote-controlled unit for the initiation of the heating element in the temperature control unit. What especially has been needed is a device that controls energy consuming heat or cooling sources at set-back levels whenever the area supplied by that source is not being used.

It is an object of the invention to teach an easily installed, simply constructed, easily operable means for obtaining the necessary room comfort temperature while at the same time being assured that the operation of the heat/cool source will not continue when the room is unoccupied.

It is another object of this invention to teach a thermostat control that may be actuated by the occupant requiring the room comfort when a remote switching override has been set to allow this capability; this circuitry is a totally integrated assembly that incorporates a method for initiating the required control function, an adjustable electronic solid state timer to maintain the controlled function for a predetermined length of time, a transformer, and a single set-back or dual range, heat set-back, cool advance thermostat.

It is also an object of this invention to teach a controlled thermostat assembly of the type described which will incorporate a transformer for reducing the voltage applied at the electronic solid state timer circuit board when the line voltage of the heat/cool source to be controlled exceeds the voltage requirements of the electronic solid state timer circuit board.

Additionally, it is a particular object of this invention to teach an improved set-back thermostat assembly, having a thermostat, an electrical, energizable heat-emitting element in thermally-effective juxtaposition relative to said thermostat, and an electrical circuit connected to said element, said circuit comprising means for conducting and interrupting electrical current through said element for selectively energizing and de-energizing said element, wherein the improvement comprises assembly means of unitized construction; means coupled to said element and said circuit operative in a first mode for enabling a given amount of current to be conducted through said element, and operative in a second mode for enabling an amount of current differing from said given amount to be conducted through said element; and means enabling said assembly to accommodate a plurality of voltages.

Further objects and features of this invention will become more apparent by reference to the following description, taken in conjunction with the accompanying figure as follows:

FIG. 1 is a block circuit diagram of the improved, set-back thermostat assembly.

As shown in FIG. 1, the circuit 10 for our improved set-back thermostat has a thermostat unit 11 which contains a heating element 13. When power is supplied to the heating element 13, the thermostat will sense a temperature higher than is present in the room and therefore will not call for heat. When electively initiated by the push button control 14 or an external controller 15, the timer 16 causes the triac 17 to cut off power to the set-back heating element 13, which will allow the thermostat to call for heating. While the timer 16 is preset, the decision to deactivate the set-back is the elective decision of the user who may initiate desired heating or cooling status as often as he or she desires. The triac 17 is connected in series with the heating element 13 and the control circuit 21 to accomplish this purpose by responding to the current supplied by the transistor 23. The external controller 15 can be a computer terminal, a telephone circuit or a non-manual activation unit, such as infrared circuitry. A field-adjustable timing period in the timer 16 will allow the power to be shut off to the heating element 13, enabling the thermostat 11 to call for heat. A light 18 is supplied which is illuminated when the power is cut off to the heating element 13. The light 18 is a light emmitting diode lamp electrically interconnected so that the light 18 will be illuminated when current is interrupted through the circuit.

Also provided for in the novel improved set-back thermostat are reset circuits 19 which allow for restart of the time of operation of the timer 16. A variable time control 24 is connected to the timer 16. A transformer 20 is included to permit use of the novel improvement with available line voltage of 24, 110 or 220 volts. Another unique feature is the control circuit 21 for adjusting the level of heat put out by the heating element 13. This feature allows the operator to reduce the amount of set-back utilized by the novel improved set-back thermostat. This is accomplished by removing the jumper 15 around the control circuit 21 (a diode) causing the alternating current supplied to the heating element 13 to be converted to a half wave rather than full wave. This action results in the current to the heating element 13 producing 50% of the heating possible with the jumper installed around control circuit 21 and the resultant reaction is a lowering of the temperature setting by half as much as normal. The remote reset circuit 22 will allow the resetting of the timer 16 at its original position. The external controller 15 and the reset circuit 22 are remote switches for initiating (15) the operation of the circuit 10 and for resetting the timer to the start condition to be ready for the next action of the external switch 15 or internal switch 14 to restart the timer operation.

Normally the heater element 13 is energized to make the thermostat 11 sense a higher room temperature and effectively lower its setting below the setting on the dial.

In the heat control mode, with the internal jumper of switch 23 connected to point "A" from the emitter of transistor 26, pressing the normally open push button 14 causes the transistor 28 to conduct current and initiate the operation of timer 16, a commonly available integrated circuit timer, which acts through transistor 26 immediately causing triac 17 to cease conduction for the time period timer 16 is set for. This shuts off the current in heating element 13 causing the thermostat to operate in a non-set-back normal manner. When timer 16 times out, the triac 17 will again conduct and cause current to flow in heating element 13.

The above describes operation in the "heat control" mode. In the "cooling control" mode, switch or jumper 23 is connected to point "B" connecting to the collector of transistor 27. With switch 23 in this position, current normally is not flowing through heating element 13 and the thermostat is operating in the non-set-back mode, the reverse of the heating mode operation. As in the heating mode, pressing the normally open push button 14 causes transistor 28 to conduct and initiate the operation of timer 16, which acts through transistor 26 and transistor 27 to cause triac 16 to conduct and cause current to flow in heating element 13 causing the thermostat temperature setting to be lowered causing cooling of the controlled area (room).

The assembly is adaptable to electric, oil, gas or wood heating systems and can be used with low or high voltage systems, as well as pneumatic control systems.

While the invention has been described in connection with a specific embodiment thereof, it is to be clearly understood that this is done only by way of example, and not as a limitation to the scope of the invention as set forth in the objects thereof and in the accompanying claims.

I claim:

1. An improved, set back thermostat assembly, having a thermostat, an electrical, (energizable) controllable heat emitting element in thermally-effective juxtaposition relative to said thermostat, and an electrical circuit, connected to said element, said circuit comprising means for (conducting) effecting and interrupting electrical current through said element electively (energizing and) de-energizing said element, wherein the improvement comprises:

assembly means of unitized construction;

means coupled to said element and said circuit operative in a first normal mode for enabling a (given) controlled amount of current to be conducted through said element, and operative in a second mode for (enabling an amount of current differing from said given amount to be conducted through) electively and randomly disconnecting said current from said element;

means enabling said assembly to accommodate a plurality of voltages; (and)

electrically-interconnected means for electively and ramdomly disconnecting electrical current from said circuit (initiated on the specific site.) initiated on said unitized assembly;

said element-coupled means comprises a diode in series connection with said element;

said element-coupled means further comprises a disengageable jumper connection connected in parallel with said diode;

said current effecting and interrupting means comprises a solid-state, electronic switching means in series connection with said element;

said switching means comprises a solid-state electronic switch, a source of electrical potential, and means electrically interconnecting said source and said switch;

said electrically-interconnecting means includes adjustable means for controlling the amount of time during which electrical current is interrupted through said element;

said electrically-interconnecting means further includes means for visually signalling an interruption of current from conduct thereof through said element thereby indicating said thermostat assembly is operating without set-back; and said signalling means comprises a light-emitting diode.

* * * * *

UNITED STATES PATENT AND TRADEMARK OFFICE
CERTIFICATE OF CORRECTION

PATENT NO. : 4,524,908
DATED : June 25, 1985
INVENTOR(S) : John Marshall et al.

It is certified that error appears in the above-identified patent and that said Letters Patent is hereby corrected as shown below:

On the first page of the patent, INID code No. (76) should read -- Henry B. Clark, Jr., Box 117, Underhill Center, Vt. 05490 --.

Signed and Sealed this

Fifteenth Day of April 1986

[SEAL]

Attest:

DONALD J. QUIGG

Attesting Officer

Commissioner of Patents and Trademarks